United States Patent [19]
Christiansen

[11] 3,887,388
[45] June 3, 1975

[54] CEMENT MANUFACTURE
[75] Inventor: Soren Bent Christiansen, Copenhagen Valby, Denmark
[73] Assignee: F. L. Smidth & Co., Cresskill, N.J.
[22] Filed: July 2, 1973
[21] Appl. No.: 375,372

[30] Foreign Application Priority Data
July 10, 1972 United Kingdom............... 32232/72

[52] U.S. Cl. ............................................... 106/100
[51] Int. Cl. ............................................... C04b 7/44
[58] Field of Search......................... 104/100; 55/82; 423/240–242, 244; 432/13, 14, 16

[56] References Cited
UNITED STATES PATENTS

| | | | |
|---|---|---|---|
| 3,212,764 | 10/1965 | Muller et al. ........................ | 106/100 |
| 3,317,201 | 5/1967 | Muller et al. ........................ | 106/100 |
| 3,692,287 | 9/1972 | Kohl et al. ........................... | 106/100 |
| 3,703,275 | 11/1972 | Sylvest............................... | 106/100 |
| 3,784,389 | 1/1974 | Hastrup ............................. | 106/100 |

Primary Examiner—J. Poer
Attorney, Agent, or Firm—Pennie & Edmonds

[57] ABSTRACT

Improvements relating to cement manufacture wherein a unique method and a plant for practicing the method are disclosed for removing at least a portion of gaseous compounds containing alkalis, chlorine or sulphur from the exit gases of a rotary kiln in which cement raw meal is burnt to cement clinker with a view to subsequent cement manufacture. The method comprises the steps of dividing the hot exit gases from the rotary kiln into a main gas flow and a separate divisional flow and directing the main flow through a suspension preheater for preheating cement raw meal prior to feeding the raw meal into the kiln. A plurality of individual relatively cool solid condensation bodies are directed to pass through the divisional flow under the influence of gravity to permit the alkalis, chlorine or sulphur to condense on the surface of the bodies and the condensed compounds are removed from the bodies for redirecting them into the separate divisional flow. Prior to redirecting the bodies into the divisional flow they may be advantageously cooled to thereby permit lowering of the temperature of the gas flow. A plant is disclosed for practicing the method.

34 Claims, 7 Drawing Figures

CEMENT MANUFACTURE

BACKGROUND OF THE INVENTION

1. Field of the Invention

This invention relates to a method of removing a portion of the gaseous compounds containing alkali, chlorine or sulphur from the exit gases of a rotary kiln in which cement raw meal is burnt to cement clinker as a stage in cement manufacture. The invention also relates to a plant for practicing the method.

2. Description of the Prior Art

In order to reduce the fuel consumption of the rotary kiln used in the manufacture of cement clinker and to obtain efficient operation of the plant, it has become general practice to effect a preheating and hence a partial calcination of the raw meal in a suspension preheater before the raw meal is introduced into the rotary kiln for the main heat treatment. In the main heat treatment calcination is completed by a burning or sintering process.

Nearly all cement raw materials contain to some extent compounds with a content of alkali, chlorine or sulphur, and these compounds may give rise to various drawbacks if their quantity is too great. For the sake of convenience, these compounds will be referred to as alkalis from now on, although it is to be remembered that the term "alkalis" is intended to mean compounds with a content of either alkali, chlorine or sulphur. It has been found that if the cement manufacture takes place in accordance with the method outlined above, the drawbacks due to the alkalis are particularly evident.

The nature of the drawbacks is known particularly to persons skilled in the manufacture of cement. An excessive content of alkali will in particular manifest itself by the formation of very inconvenient cakings in the suspension preheater, by a more troublesome burning process in the rotary kiln, and by an inferior quality of the cement produced.

In the prior art many attempts have therefore been made to eliminate the deleterious effects of the alkalis, and these have, to a certain extent, been successful, but not without causing other lesser drawbacks.

In one method, a direct contact is established between the hot exit gases from the rotary kiln and layers of relatively cold bodies (called condensation bodies), causing gaseous alkalis contained in the exit gases to condense as a solid coating on the surfaces of the bodies, which subsequently have to be removed from the gas flow for cleaning. In U.S. Pat. No. 3,212,764 to Muller et al., there is disclosed a method for burning cement raw material wherein exit gases of the kiln are brought into contact with a fine grained material to precipitate alkalis contained in the gases. A part of the exit gases if forced through a container after leaving the kiln and brought into contact with the fine grained solid material which is simultaneously passed through the container. The method requires removal of the fine grained material after it has taken up the alkalis.

U.S. Pat. No. 746,261 to Baggaley relates to an Apparatus for Removing Impurities From Furnace Gases. U.S. Pat. No. 1,909,820 to Falla relates to a Cement Apparatus and Method of Operation Thereof. U.S. Pat. No. 2,590,090 to DeVaney relates to a Nodulizing Process and Apparatus. U.S. Pat. No. 2,823,910 to Ravasio relates to a Cement Furnace. U.S. Pat. No. 3,022,989 to Pyzel relates to a Hydraulic Cement Process. U.S. Pat. No. 3,116,054 to Bartmann relates to a Heating Arrangement. U.S. Pat. No. 3,151,187 to Conte relates to a Fluid Filtering System. U.S. Pat. No. 3,235,239 to Petersen relates to a Method and Apparatus for Making Cement. U.S. Pat. No. 3,451,665 to Strassen relates to a Process for the Production of a Low Alkali Content Cement. U.S. Pat. No. 3,685,262 to Kressley relates to a Self-leveling Grateless Stack Gas Scrubber. U.S. Pat. No. 3,716,969 to Maeda relates to a Continuous Moving Layer Type Adsorption Device. None of these patents relate to a Method or Plant for removing alkali from at least a portion of the hot exit gases such as I have invented, wherein a divisional flow of the gas is separated, cleaned and partially cooled by a system of reusable relatively large condensation bodies having sufficient surface area to adequately and efficiently perform the cleaning and cooling of the divisional flow of gas.

SUMMARY OF THE INVENTION

The present invention is a modification and improvement of prior methods. According to the invention, there is provided a method of removing a portion of the alkalis, that is gaseous compounds containing alkali, chlorine or sulphur, from the exit gases of a rotary kiln in which cement raw meal is converted to cement clinker. The method comprises dividing the flow of exit gases from the rotary kiln into a main flow which is passed through a suspension preheater to preheat cement raw meal before the meal is fed into the kiln, and a divisional flow, and causing the divisional gas flow to pass through a rain of freely falling condensation bodies which are cold relative to the temperature of the divisional gas flow so that at least a portion of the alkalis in the divisional gas flow condense on the condensation bodies and are removed from the divisional gas flow as solid coatings on the falling bodies.

The division of the exit gas flow is arranged so that by removing a portion of the alkalis from the exit gas flow in the divisional flow, the actual quantity of alkalis which are carried into the preheater by the main flow is reduced to an acceptable level. Furthermore, the efficient removal of alkalis from the divisional flow enables this flow subsequently to be added to the main flow in the preheater or alternatively to another part of the cement manufacturing plant where the absence of alkalis is preferred, as will be described in more detail.

The efficient alkali removal from the divisional gas flow is due, in part, to the use of a large number of individual condensation bodies which are caused to fall freely through the gas flow. The bodies do not touch each other to any appreciable extent and present a large total surface area for condensation bodies of the alkali vapours so that a very large proportion of the alkalis contained in the divisional gas flow is caught. Consequently, this portion of the alkalis will not contact the raw meal in the preheater and will therefore not contribute to contaminating the raw meal fed to the kiln.

Due to the large cold condensation surface area provided by the condensation bodies for the alkali vapours present in the divisional flow at the earliest possible stage after it has left the rotary kiln, the walls of the passage through which the divisional flow is passed will only be slightly subjected to alkali cakings. Should tendencies to such caking occur, the condensation bodies which fall in the proximity of the passage walls will generally tear off any caking at its initial stage of formation.

The divisional flow of exit gas in the section in which contact is established between the gas and the condensation bodies may be caused to move either upwards, that is substantially countercurrently to the freely falling condensation bodies, or horizontally, that is substantially cross-currently to the freely bodies. Usually, the local conditions, particularly with regard to space, will be decisive to determine whether the use of one or the other of these two methods is advantageous in a particular case.

The condensation bodies may be made of metal or ceramic material and may be formed as spherically configured balls, cylinders or spirals. In particular, it has been found to be advantageous to use iron balls of substantially equal size and having a diameter between 2 and 10 mm. Iron balls within this diameter range will have an adequate rate of fall in the divisional gas flow and will not be liable to be entrained in the gas flow, regardless of whether the flow is countercurrent or crosscurrent to the free fall of the bodies.

When the alkali-coated condensation bodies have left the gas flow, they are preferably relieved of their coatings so that they can be re-used. The release may be effected by subjecting the bodies to impacts, shocks, vibratory or frictional forces, to loosen the coating material prior to separating it from the condensation bodies.

When the condensation bodies are not in contact with the hot divisional flow of gas, they undergo a limited degree of natural cooling. However, it is preferable that they be subjected to additional cooling after they have been relieved of their coatings and prior to re-introducing them into the divisional flow of exit gas. AS a result they will be colder than they would otherwise have been when re-introduced into the divisional flow of exit gas. Thus they will be capable of condensing larger portions of alkalis in the divisional flow of exit gas.

This positive cooling of the condensation bodies may be effected by passing the condensation bodies through a continuous spray of a cooling liquid such as water, for example. The liquid will almost immediately evaporate and the bodies will remain substantially dry and gradually are cooled down to the desired temperature.

Alternatively, positive cooling of the condensation bodies may be effected by blowing atmospheric air over the condensation bodies for a suitable interval of time after they have passed through the divisional flow of exit gas.

Having been relieved of most of its alkalis and also having given up part of its heat content to the condensation bodies, the divisional flow of exit gas, at least in part, may be used in another stage of the cement manufacturing process. For example, the heat contained in the cleaned divisional flow of exit gas may be utilized by re-uniting at least a portion of the divisional flow with the main flow of exit gas during its passage through the suspension preheater. In such an arrangement it is preferable to re-unite the flows at a point at which the temperatures of the divisional flow and the main flow are approximately the same. After exiting from the preheater, and prior to being discharged into the atmosphere, the re-united gas flows may then be relieved of a substantial amount of the dust which they carry in suspension.

In an alternate embodiment of the invention, the heat contained in the cleaned divisional flow of exit gas may be utilized by adding at least a portion of the cleaned divisional flow of exit gas as a supplement to the primary and/or secondary air supplied to support combustion in the rotary kiln. However, since rotary kilns are usually of very great length and the primary and secondary air has to be supplied to the kiln at its outlet end, whereas the cleaned divisional flow of exit gas is generally available at the inlet end of the kiln, such an arrangement will generally require a long pipe to direct the cleaned divisional flow of exit gas from one end of the kiln to the other.

In another embodiment of the invention, heat contained in the cleaned divisional flow of exit gas is utilized for drying and preheating the cement raw materials prior to the material being fed as raw meal to the suspension preheater. Such heating is preferably during the actual grinding of the raw materials in a mill. Since the grinding mill of a cement works is generally located near the inlet end of the rotary kiln, problems of heat loss during the transfer of the cleaned divisional flow is not significant.

In another feature of the invention, the cleaned divisional flow of exit gas is passed through a dust precipitator prior to being discharged into the atmosphere. During passage through the dust collector, dust which is carried by the divisional gas flow and which is relatively alkali free is collected. This further cleans the gas prior to its discharge into the atmosphere. The dust may be added to the raw meal which is fed into the rotary kiln. Also, the dust precipitator which is used to clean the main flow of exit gas after its passage through the suspension preheater and prior to its discharge into the atmosphere may be used to clean the divisional gas flow.

In accordance with a further feature of the invention, a plant for carrying out the method described is disclosed. The plant comprises a rotary kiln for the burning of cement raw meal to cement clinker and a suspension preheater connected to the rotary kiln for preheating the raw meal by means of the exit gases from the rotary kiln prior to the introduction of the raw meal into the rotary kiln. A dust precipitator is connected to the suspension preheater for cleaning the cooled exit gases prior to their discharge to the atmosphere. A branch passage off the connection from the rotary kiln to the suspension preheater is provided so that, in practice, the exit gases from the kiln are divided into a main flow which passes through the preheater and a divisional flow which passes into the branch passage. Means are provided to supply a continuous series of condensation bodies through one or more openings in the wall of the branch passage in such a manner that the condensation bodies are caused to fall freely as a rain, countercurrently or cross-currently, through the divisional gas flow passing along the passage. Means for intercepting the condensation bodies coated with alkalis condensed from the gas flow are provided at the end of their fall. Also means are provided to pass the bodies out of the passage through one or more openings provided.

BRIEF DESCRIPTION OF THE DRAWINGS

Examples of plants and methods of operation in accordance with the invention will now be described with reference to the accompanying drawings, in which.

DETAILED DESCRIPTION OF THE PREFERRED EMBODIMENTS

Figure 1:
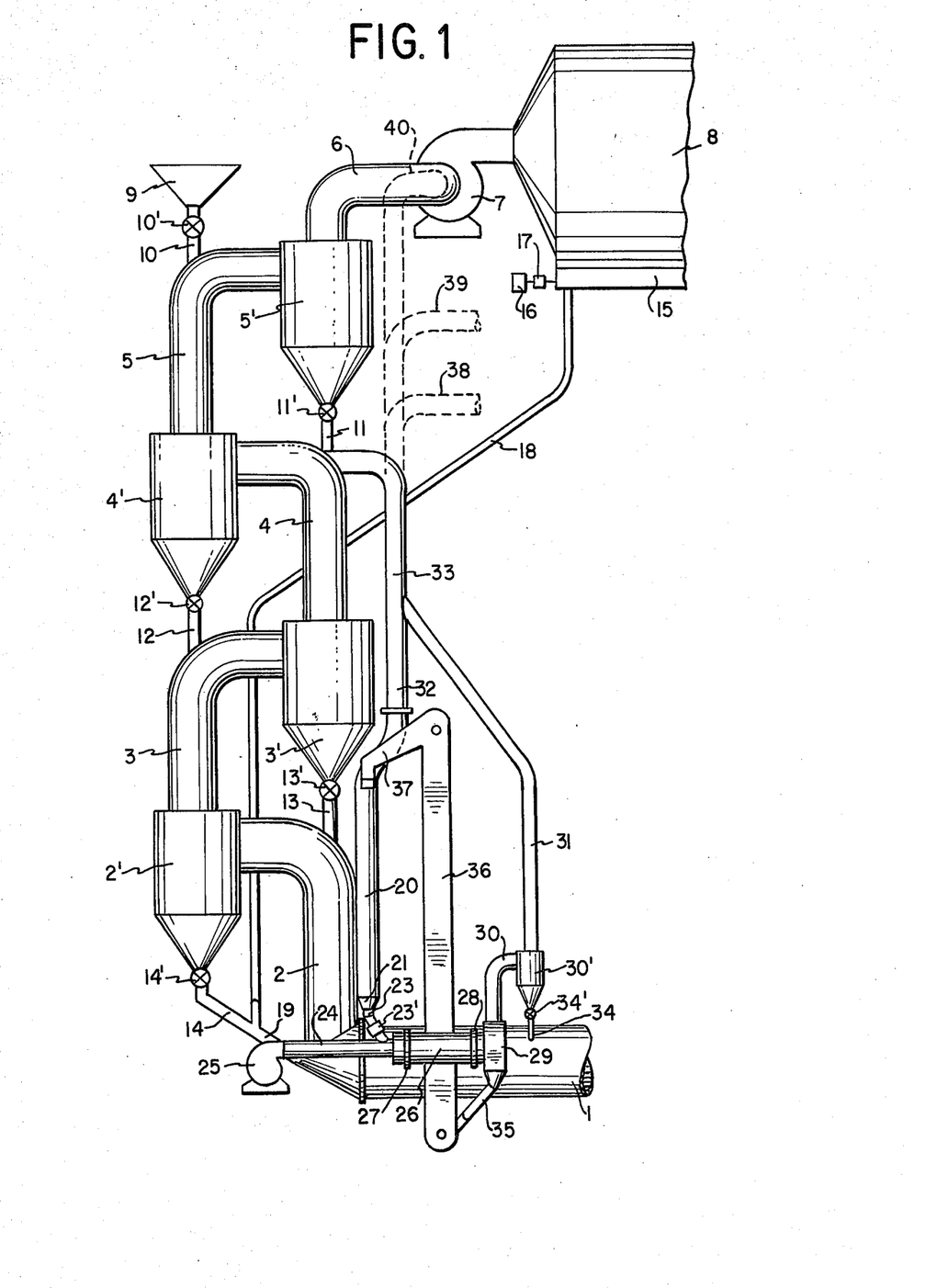
FIG. 1 is a side view of one form of plant for carrying out the method according to the invention, the plant being arranged so that condensation bodies fall in countercurrent to the flow of gases.
Figure 2:
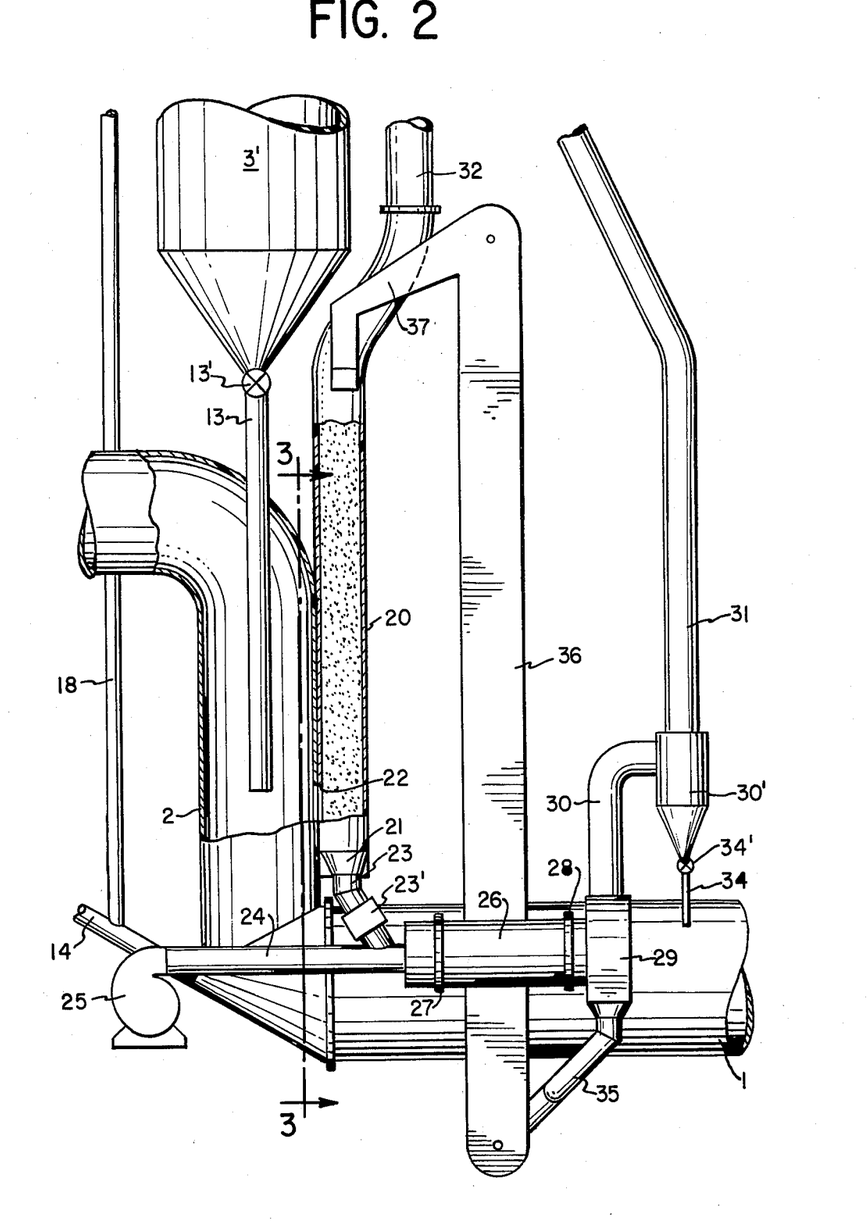
FIG. 2 is a larger scale view, partly in section, of the lower part of the plant shown in FIG. 1.
Figures 3, 4:
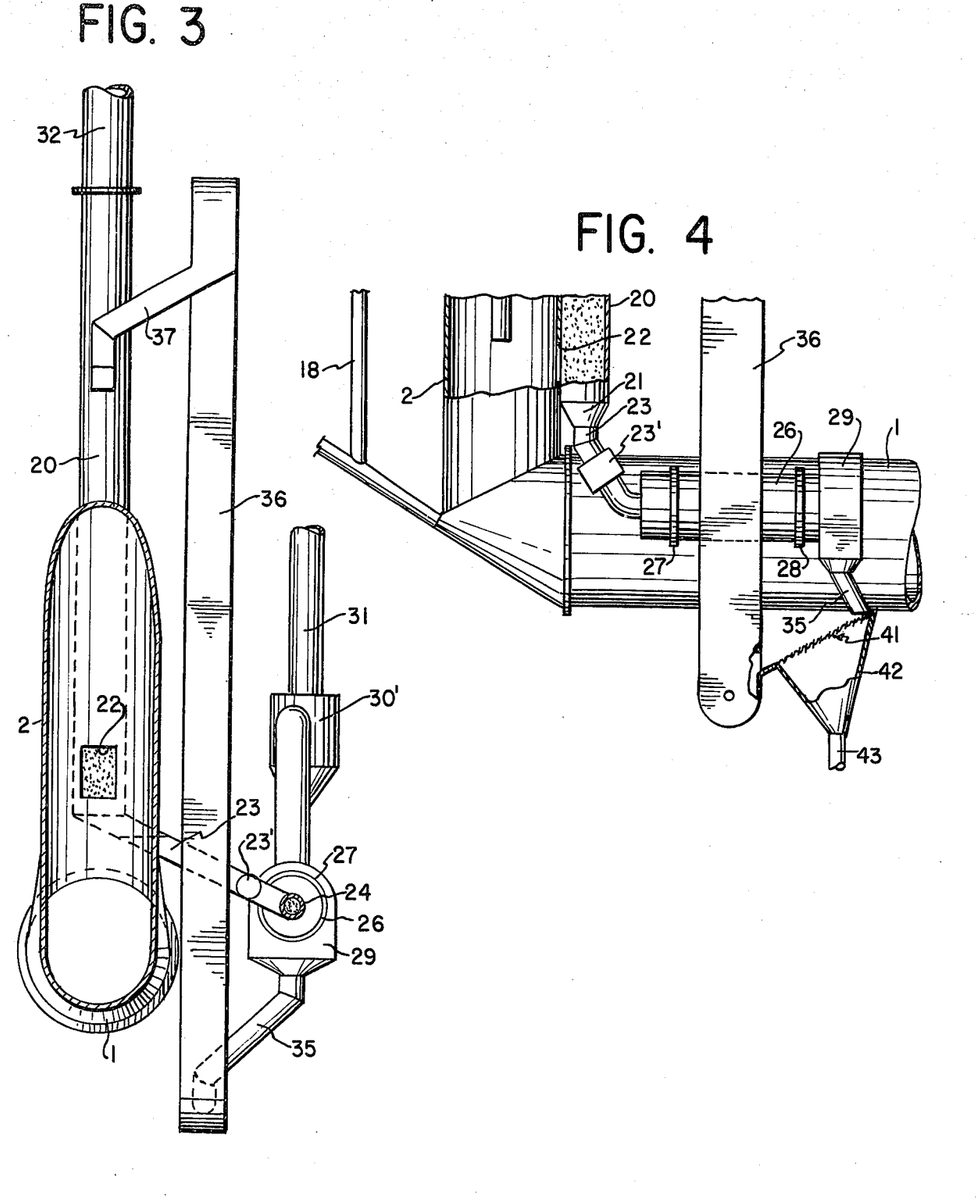
FIG. 3 is a section taken on the line 3—3 of FIG. 1.
FIG. 4 is a view similar to that of FIG. 2, but showing a modified form of the plant.

Referring initially to FIGS. 1, 2 and 3, the reference numeral 1 denotes the gas exit end of a rotary kiln which is rotatable on supports (not shown). To the rotary kiln is connected a four-stage cyclone preheater for preheating cement raw meal which is introduced into the rotary kiln to be burnt to cement clinker. Each of the four preheater stages consists of a riser pipe and a cyclone. The riser pipes are denoted as numerals 2, 3, 4 and 5, and the respective cyclones are denoted as numerals 2', 3', 4' and 5'. The riser pipe 2 is connected to the end 1 of the rotary kiln. A pipe 6 exiting from the uppermost cyclone 5' of the preheater is connected to a fan 7 which produces the sub-atmospheric pressure required in the cyclone preheater to draw the exit gases from the rotary kiln and through the preheater.

The delivery side of the fan 7 communicates directly with an electrostatic dust precipitator 8, which is shown in part only, and in which dust and other solid impurities contained in the exit gases are removed so that the flow of exit gas is cleaned before it is discharged into the atmosphere through a vent pipe (not shown).

The raw meal to be preheated is fed continuously to the cyclone preheater through a hopper 9 and a feed pipe 10 which projects into the riser pipe 5 of the uppermost cyclone 5' of the preheater. The feed pipe 10 contains a sluicing device 10' which prevents atmospheric air (so-called "false air") from being drawn into the cyclone preheater due to the sub-atmospheric pressure in the preheater. The sluicing device 10' may take various forms, and the one illustrated in the drawings should be considered representative of any suitable design. The raw meal separated off in the cyclone 5' is discharged through a feed pipe 11, containing a sluicing device 11', into the riser pipe 4 of the cyclone 4'. The raw meal then proceeds in a similar manner through the cyclones 4', 3' and 2' in turn, via feed pipes 12, 13 and 14 beneath the cyclones 4', 3', and 2' respectively. The pipes 12, 13 and 14 contain sluicing devices 12', 13' and 14' respectively.

A worm conveyor 15 rotated by a motor 16 through a reduction gear 17 collects the conveys the dust precipitated in the electrostatic dust precipitator 8 to a discharge pipe 18 at one end of the precipitator 8. The dust is fed through the pipe 18 into the feed pipe 14 leading from the cyclone 2'. Thus, the raw meal separated off in the cyclone 2' together with the dust precipitated in the electrostatic dust precipitator 8 is fed along a pipe 19 (a continuation of the feed pipe 14) which leads into the lower end of the riser pipe 2. The base of the pipe 2 is inclined so that the combined charge is then fed into the rotary kiln 1.

What has been described so far is conventional and comprises basically a rotary kiln equipped with a cyclone preheater and an electrostatic dust precipitator. The mode of operation of such a plant is assumed to be known.

In accordance with the invention, a shaft 20 extends vertically from adjacent the bottom end of the riser pipe 2 and continues a little above it. The shaft 20 has an opening 22 near its lower end which communicates with the interior of the riser pipe 2 so that a portion of the gases leaving the rotary kiln into the pipe 2 pass into the shaft 20. The bottom 21 of the shaft 20 is inclined and leads into a sloping outlet pipe 23 with a sluicing device 23' for allowing solids, i.e., condensation bodies coated with alkalis, to be discharged from the shaft without the simultaneous passage of gas either into or out of the shaft. The sloping outlet pipe 23 leads into a horizontal pipe 24 one end of which extends into a rotary drum 26, so that the alkali-coated condensation bodies discharged from the sloping pipe 23 slide and roll through the pipe 24 and thence into the drum 26. The drum 26 is equipped with slide rings 27 and 28 resting on rollers (not shown) so that the drum may be rotated continuously about its horizontal axis by driving means (not shown). The drum is provided internally with devices which cause the condensation bodies travelling through the drum to be struck and rubbed against one another and against the drum so that their alkali coatings are worn off in the form of a powder. The powder which is separated from the bodies is then entrained in a stream of air which is fed into the drum 26 by a fan 25. The outlet of the fan 25 is connected to the end of the pipe 24 remote from the drum 26. Both the condensation bodies and the stream of air with the powder entrained in it pass into a chamber 29 which surrounds the open outlet end of the drum 26. The upper end of the chamber 29 is connected to a riser pipe 30 which leads into the cyclone 30'. The air and dust pass into the cyclone 30' where the alkali dust is separated out and the air escapes from the top of the cyclone through a pipe 31, which, after joining with a pipe 32, continues as pipe 33 as shown clearly in FIG. 1. The pipe 32 communicates at its lower end with the upper end of the shaft 20.

The alkali dust separated out at the bottom of the cyclone 30' is discharged through a pipe 34 in which a conventional sluicing device 34' is inserted. This dust may be dumped or it may alternately be used as an alkali fertilizer.

Whereas the alkali dust and the air flows upwardly from the top of the chamber 29, the cleaned condensation bodies fall downwardly inside the chamber 29 into a pipe 35 which leads them to the bottom of the bucket elevator 36. The bucket elevator 36 raises the condensation bodies for reintroduction into the top of the shaft 20 by means of a closed channel 37. As a result of the cooling of the bodies which takes place by the air flow passing through the drum 26, the bodies are then reintroduced into the shaft 20 in a cooled condition.

The cleaned and cool condensation bodies then move by gravity down through the shaft 20 as a dense discreet rain in countercurrent to the upward flow of gases introduced into the shaft through the opening 22 near the lower end of the shaft 20. The opening 22 is preferably as close as possible to the rotary kiln opening so that the exit gases from the kiln are divided into two flows at the earliest possible stage; i.e., a first main flow of exit gas through the riser pipe 2; and a second divisional flow through the opening 22 and up through the shaft 20. As a result, alkalis contained in the divisional flow of exit gas are prevented from coming into contact with the raw meal passing through the preheater and these alkalis are removed from the divisional exit gas flow by being deposited on the condensation bodies as these rain down the shaft 20. As previously explained, the alkali coatings are then removed from the bodies, powdered, and discharged from the plant through the pipe 34. The total amount of exit gas from the kiln is thus relieved of at least a portion of its alkali content.

Having been relieved of a part of its alkali content and a part of its heat content in the shaft 20, the divisional flow of exit gas passes through the pipes 32 and 33 and, together with the air from the pipe 31, passes into the riser pipe 4 of the cyclone preheater. The air has been warmed by heat exchange with the condensation bodies during their passage through the drum 26, and the return of the divisional exit gas flow and air mixture should preferably take place at a point of the cyclone preheater at which the ingoing gases have substantially the same temperature as the main exit gas flow already in the preheater. In this way, the remaining heat contained in the various gases will be utilized most efficiently in the upper part of the cyclone preheater. Experience has shown that the second cyclone preheater stage is very suitable for this introduction of the air and divisional gas flow mixture.

In an alternate embodiment of the invention, instead of joining the main gas flow in the cyclone preheater through pipe 33, the divisional gas flow and air mixture may be used for a number of different purposes, being caused to flow either through a pipe 38, or through a pipe 39 or alternately through a pipe 40, (each of which is indicated in dotted lines in FIG. 1) depending on the desired purpose. However, the plant is so designed that only one of the four possible alternatives (represented by pipes 33, 38, 39 and 40) is usually followed. The first possibility has already been described with respect to pipe 33, and the remaining ones will now be accounted for.

Firstly, if the pipe 33 leads into the pipe 38, the gases from the pipe 32 and the air from the pipe 31 are carried to the outlet end of the rotary kiln 1, and the gas mixture serves as primary and/or secondary air to support the combustion in the kiln. It is evident that both the flow of the exit gas coming from the pipe 32 and the air flow coming from the pipe 31 have a very low alkali content. This aspect renders these gases suitable for supply to the kiln.

Secondly, if the pipe 33 leads into the pipe 39, the gases from the pipe 32 and the air from the pipe 31 are carried to the grinding department of the cement works (in which the raw materials are ground to raw meal), and the heat content of the gas mixture is used to preheat the raw material prior to or after, but preferably during, the grinding operation. The best procedure is to pass the gas mixture through the mill, so that it is permitted to transfer its heat in the mill and simultaneously carry in suspension out of the mill the particles of raw material which have been ground to sufficient fineness in the mill. The raw meal may then be separated from the gas mixture in a cyclone, from the bottom of which the ground and preheated raw meal is extracted. The cooled gas mixture is discharged then into the atmosphere from the top of the cyclone, preferably through an electrostatic dust precipitator, such as the precipitator 8 shown in the drawings.

Thirdly and finally, if the pipe 33 leads into the pipe 40, the mixture of gas and air from the pipes 32 and 31 respectively is fed into the pipe 6 connecting the uppermost cyclone 5' of the cyclone preheater to the fan 7, so that the mixture is cleaned in the electrostatic dust precipitator 8. As a result, the dust contained in the gas mixture is utilized by being fed into the rotary kiln 1 together with the preheated raw meal along the path 15, 18, 19, 2. As previously mentioned, this dust fraction has a very low alkali content and is therefore worth recovering. However, with this arrangement, a substantial amount of the heat content in the gas mixture is lost.

Referring now to FIGS. 4 to 7, it will be seen that the basic components are substantially identical to the components indicated in FIGS. 1, 2 and 3 and therefore have the same reference numerals as is used in those FIGURES.

Referring to FIG. 4 there is illustrated the lower part of a plant which is a modification of the plant shown in FIGS. 1, 2 and 3. Whereas the drum 26 in the plant described above serves the dual function of loosening alkali coating from the condensation bodies and separating them from one another by means of an air current so that they may be conveyed to their separate destinations, in the plant of FIG. 4 the drum 26 is required to perform only the loosening function.

As can be seen, there is no means for passing a current of air through the drum by which the separation could take place. Instead, an inclined vibratory screen 41 is placed below the mouth of the pipe 35, which is not connected to the elevator 36 as in FIG. 1, and the mixture of condensation bodies and the loosened alkali powder is distributed on to the screen.

The alkali powder passes through the screen openings into a chute 42, whereas the condensation bodies, which are too large to pass through the screen openings, roll down the screen surface and through an opening into the elevator shaft 36. The chute 42 leads into a pipe 43, by means of which the alkali powder may be passed to a collection or disposal point. The pipe 43 thus corresponds to the pipe 34 shown in FIG. 2.

It will be appreciated that in contrast to the arrangement shown in FIGS. 1, 2 and 3 there is no positive cooling of the condensation bodies after they have been cleaned and before they are introduced into the elevator 36. However, this does not mean that the condensation bodies are not cooled, since they are always subject to natural cooling when removed from the hot divisional flow of exit gas.

Figure 5:
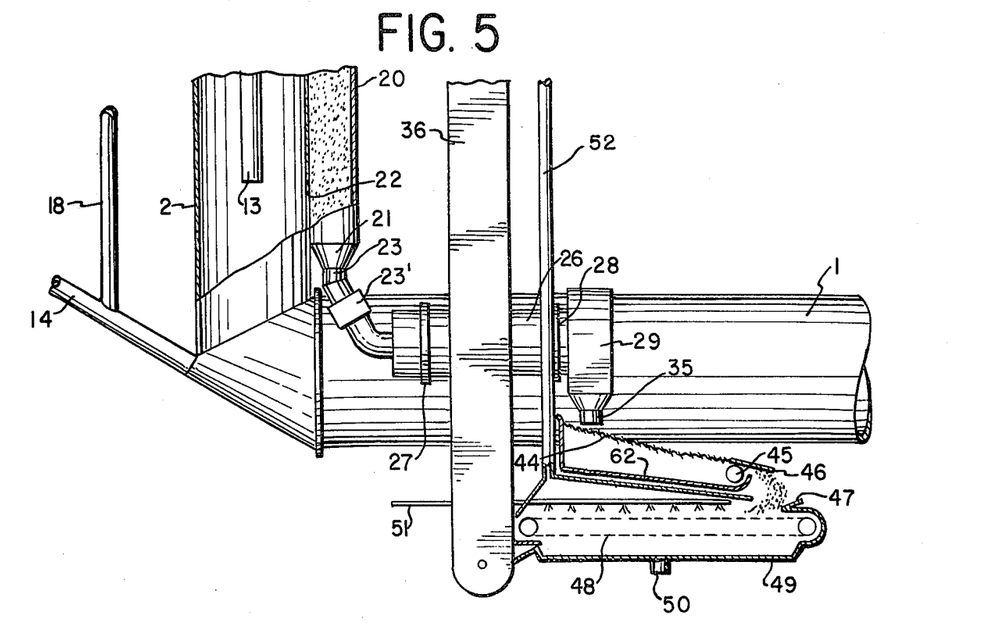
FIG. 5 is a more detailed view of the lower part of FIG. 4, but showing a modification of the plant of FIG. 4.

The plant illustrated in FIG. 5 is similar to the plant shown in FIG. 4 except that means are provided for a positive cooling of the condensation bodies in addition to the natural cooling.

In the plant of FIG. 5 the mixture of condensation bodies and alkali-containing powder from the drum 26 falls through the pipe 35 onto a vibratory screen 44. The screen 44 is tilted in the right-hand direction, as is the bottom of a tray 62 provided beneath the screen for catching the powder which passes through the screen openings. Owing to the vibrations of the screen, the powder slides downwards on the tray and is caught by a worm conveyor 45 (arranged at right angles to the plane of the paper) whereby the powder is carried away.

The condensation bodies, however, roll down the screen surface until reaching a surface 46 which directs the bodies to a chute 47 from which they fall on to a perforated conveyor band 48 extending between two rollers and moved by a driving mechanism (not shown) so that the upper part of the conveyor band moves from right to left as shown in the drawing. Beneath the conveyor band 48 is a trough 49 which has an outlet 50, and above the conveyor band is a spray pipe 51 through which water is sprayed over the conveyor. The condensation bodies, which are passed from right to left by the conveyor band, are thus showered by the water spray and are thereby cooled before being discharged by the conveyor band on to a chute which leads into the elevator 36.

The amount of cooling water is arranged so that the condensation bodies remain dry while they are being cooled, the water evaporating immediately. The water vapours are collected by a hood and escape through a pipe 52 which leads upwardly and may be connected in the same way as the pipe 31 shown in FIGS. 1, 2 and 3. Should the supply of water be too large, the excess water will drip through the conveyor band into the trough 49 and drain through the outlet 50.

Figure 6:
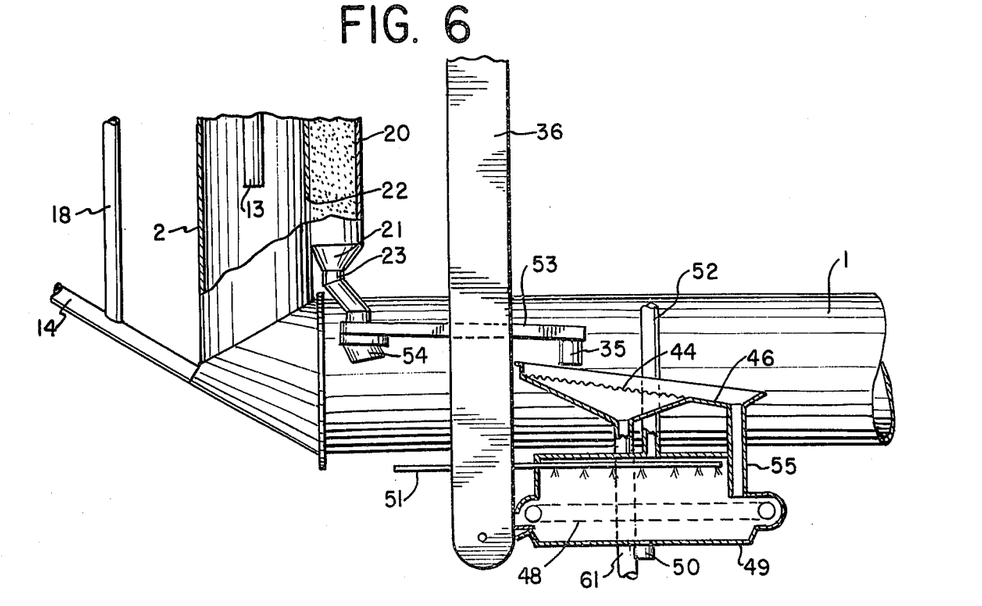
FIG. 6 is a view similar to that of FIG. 5, but showing a still further modified form of plant; and, FIG. 7 is a side view, partly in section, of the lower part of a plant which is arranged so that the condensation bodies fall cross-currently to the gas flow.

FIG. 6 shows a plant which is similar to that of FIG. 5, but in which the alkali coating is loosened from the condensation bodies in a manner other than by means of the drum 26. The pipe 23 leading from the bottom of the shaft 20 discharges onto a conveyor trough 53 which is vibrated by a motor 54. From the conveyor trough 53 the alkali-coated condensation bodies fall onto a vibratory screen 44 which has two functions: to loosen the coating from the bodies, and to separate the powder so formed from the bodies. The coating is loosened, or worn away, by the bodies rubbing and striking against one another and against the screen as they are moved along the screen; and the separation takes place by the vibration causing the alkali powder to fall through the screen openings into a closed space beneath the screen, from which the powder is removed through a pipe 61. The condensation bodies, however, roll from the screen onto a surface 46, and hence through a vertical pipe 55 down onto a cooling apparatus similar to that shown in FIG. 5, before reaching the elevator 36.

Figure 7:
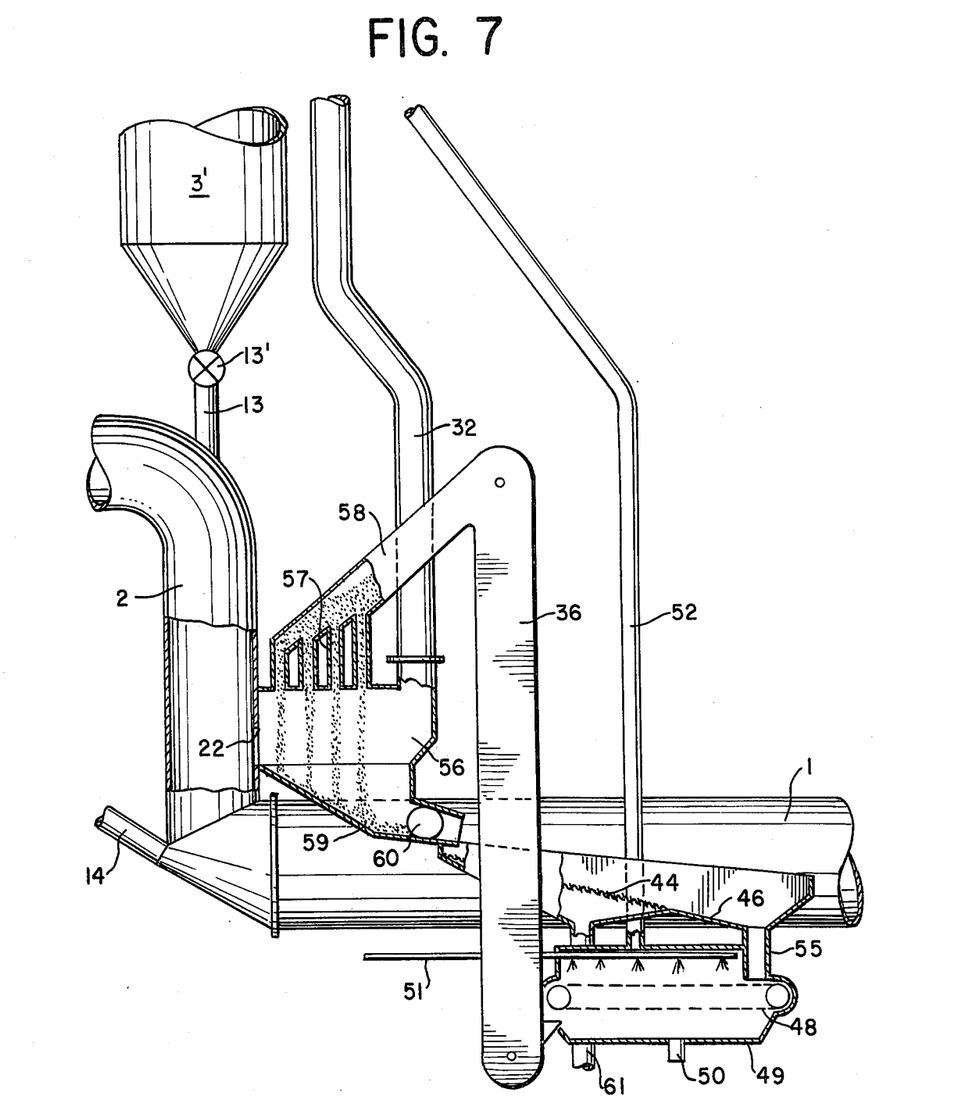

FIG. 7 shows a plant in which the divisional flow of kiln exit gases is cross-current to the falling condensation bodies. Apart from this difference the plant of FIG. 7 corresponds in all other respects to the plant described with reference to FIG. 6. Equivalent parts are thus provided with the same reference numerals.

Whereas in the previously described plants there is a vertical shaft 20 between the pipe 32 and the division opening 22 in the riser pipe 2, the plant shown in FIG. 7 has a channel 56 extending in a horizontal direction away from the opening 22, and the pipe 32 extends downwardly to communicate with the end of the channel remote from the opening 22 as shown. The upper side of the channel 56 is provided with a number of openings which are not all in the plane of the paper, but are distributed along and across the top of the channel. To these openings are connected vertical, upwardly extending pipes 57 uniting at their tops into a single, inclined duct 58 into which the upper end of the bucket elevator 36 discharges cooled and cleaned condensation bodies. The bodies will be discharged continuously into the inclined duct 58 and are distributed into the pipes 57. Hence, the bodies fall freely as a continuous rain into the channel 56 through the openings at its upper end. The bodies are too heavy to be entrained by the divisional flow of exit gas which passes horizontally through the channel 56 from the opening 22 and hence the gas flow and the condensation bodies move approximately perpendicularly to each other. Owing to this cross-current of hot, alkali-containing gases and cold condensation bodies, the bodies will be coated at least in part by alkalis, and they are then collected by a hopper 59 which forms the bottom of the channel 56 opposite the openings in its top. The hopper 59 discharges onto a vibratory screen 44. The discharge orifice contains a conventional sluicing device 60 which prevents false air from being drawn up through the hopper by suction applied by the cyclone preheater. The alkali-coated condensation bodies are then subjected to a treatment corresponding closely to the treatment that is described above with reference to FIG. 6.

I claim:

1. A method of removing at least a portion of gaseous compounds containing at least one of alkali, chlorine and sulphur from the exit gases of a rotary kiln in which cement raw meal is burnt to cement clinker with a view to subsequent cement manufacture comprising the steps of dividing the hot exit gases from the rotary kiln into a main gas flow and a separate divisional flow; directing the main gas flow through a suspension preheater for preheating cement raw meal prior to feeding the raw meal into the kiln; directing a plurality of individual relatively cool generally spherical solid condensation bodies of at least one of iron and ceramic material to pass through said divisional flow substantially under the influence of gravity in a manner which permits direct contact between said hot exit gas of said divisional flow and said bodies such that gaseous compounds containing at least one of alkali, chlorine and sulphur are condensed to form a coating on at least a portion of the surface of said bodies; removing said condensation bodies from said divisional gas flow; removing at least a portion of said condensed gaseous compounds from said condensation bodies; and redirecting said bodies into said divisional gas flow for the continuous removal of the gaseous compounds from the exit gases of said kiln.

2. The method according to claim 1 further comprising directing a plurality of individual relatively cool, generally spherical solid condensation bodies of at least one of iron and ceramic material having a diameter range of approximately 2 mm to 10 mm to pass through said divisional flow.

3. The method according to claim 1 wherein said divisional gas flow is directed in a substantially upward direction and said condensation bodies are permitted to fall substantially countercurrently to said divisional flow while contact is made between said bodies and said divisional gas flow.

4. The method according to claim 3 further comprising directing a plurality of individual relatively cool, generally spherical solid condensation bodies of at least one of iron and ceramic material having a diameter range of approximately 2 mm to 10 mm to pass through said divisional flow.

5. The method according to claim 1 wherein said divisional gas flow is directed to flow in a substantially horizontal direction such that said divisional flow is substantially cross-currently to said falling condensation bodies.

6. The method according to claim 5 further comprising directing a plurality of individual relatively cool, generally spherical solid condensation bodies of at least one of iron and ceramic material having a diameter range of approximately 2 mm to 10 mm to pass through said divisional flow.

7. The method according to claim 1 further comprising the steps of removing said coating by subjecting said bodies to at least one of impacts, shocks, vibratory motion and frictional forces so as to remove said condensed coatings of gaseous compounds while simultaneously cooling said condensation bodies and re-introducing said cleaned condensation bodies through said divisional gas flow.

8. The method according to claim 7 further comprising directing a plurality of individual relatively cool, generally spherical solid condensation bodies of at least one of iron and ceramic material having a diameter range of approximately 2 mm to 10 mm to pass through said divisional flow.

9. The method according to claim 7 further comprising the step of subjecting said condensation bodies to additional cooling after removing the coatings of condensed gaseous compounds and prior to re-introducing them into the divisional flow of exit gas.

10. The method according to claim 9 further comprising the step of spraying said condensation bodies with a cooling liquid for predetermined time periods; and permitting said liquid to evaporate such that the temperature of said condensation bodies is reduced to a predetermined level prior to re-introducing said bodies into said divisional flow of exit gas.

11. The method according to claim 9 further comprising the step of cooling said condensation bodies by exposing at least a portion thereof to atmospheric air after they have been removed from said divisional flow of exit gases.

12. The method according to claim 11 further comprising the step of utilizing said cleaned divisional flow of exit gas in the cement manufacturing process after the removal of the gaseous compounds therefrom.

13. The method according to claim 12 further comprising the steps of: reuniting at least a portion of said divisional flow of exit gas with said main flow of exit gas after removing said gaseous compounds at a point at which the temperature of the divisional flow is substantially identical to the temperature of said main flow so as to efficiently utilize the heat contained in said gases; and removing at least a portion of suspended dust from said gases prior to discharging them into the atmosphere.

14. The method according to claim 12 further comprising the step of utilizing the heat contained in said cleaned divisional gas flow by adding at least a portion of the cleaned divisional gas flow to the primary and/or secondary air supplied to support combustion in the kiln.

15. The method according to claim 12 further comprising the step of utilizing the heat contained in said cleaned divisional gas flow by directing at least a portion of the cleaned divisional flow to a grinding mill for preheating cement raw materials during grinding thereof and prior to feeding said materials to a suspension preheater as raw meal.

16. The method according to claim 12 further comprising the step of directing at least a portion of the cleaned divisional flow of exit gas through a dust precipitator for removal of dust therefrom prior to discharging it into the atmosphere.

17. The method according to claim 3 further comprising the steps of removing said coating by subjecting said bodies to at least one of impacts, shocks, vibratory motion and frictional forces so as to remove said condensed coatings of gaseous compounds while simultaneously cooling said condensation bodies and re-introducing said cleaned condensation bodies through said divisional gas flow.

18. The method according to claim 17 further comprising the step of subjecting said condensation bodies to additional cooling after removing the coatings of condensed gaseous compounds and prior to re-introducing them into the divisional flow of exit gas.

19. The method according to claim 18 further comprising the step of spraying said condensation bodies with a cooling liquid for predetermined time periods; and permitting said liquid to evaporate such that the temperature of said condensation bodies is reduced to a predetermined level prior to re-introducing said bodies into said divisional flow of exit gas.

20. The method according to claim 18 further comprising the step of cooling said condensation bodies by exposing at least a portion thereof to atmospheric air after they have been removed from said divisional flow of exit gases.

21. The method according to claim 20 further comprising the step of utilizing said cleaned divisional flow of exit gas in the cement manufacturing process after the removal of the gaseous compounds therefrom.

22. The method according to claim 21 further comprising the steps of: reuniting at least a portion of said divisional flow of exit gas with said main flow of exit gas after removing said gaseous compounds at a point at which the temperature of the divisional flow is substantially identical to the temperature of said main flow so as to efficiently utilize the heat contained in said gases; and removing at least a portion of suspended dust from said gases prior to discharging them into the atmosphere.

23. The method according to claim 21 further comprising the step of utilizing the heat contained in said cleaned divisional gas flow by adding at least a portion of the cleaned divisional gas flow to the primary and/or secondary air supplied to support combustion in the kiln.

24. The method according to claim 21 further comprising the step of utilizing the heat contained in said cleaned divisional gas flow by directing at least a portion of the cleaned divisional flow to a grinding mill for preheating cement raw materials during grinding thereof and prior to feeding said materials to a suspension preheater as raw meal.

25. The method according to claim 21 further comprising the setp of directing at least a portion of the cleaned divisional flow of exit gas through a dust precipitator for removal of dust therefrom prior to discharging it into the atmosphere.

26. The method according to claim 5 further comprising the steps of removing said coating by subjecting said bodies to at least one of impacts, shocks, vibratory motion and frictional forces so as to remove said condensed coatings of gaseous compounds while simultaneously cooling said condensation bodies and re-introducing said cleaned condensation bodies through said divisional gas flow.

27. The method according to claim 26 further comprising the step of subjecting said condensation bodies to additional cooling after removing the coatings of condensed gaseous compounds and prior to re-introducing them into the divisional flow of exit gas.

28. The method according to claim 27 further comprising the step of spraying said condensation bodies with a cooling liquid for predetermined time periods; and permitting said liquid to evaporate such that the temperature of said condensation bodies is reduced to a predetermined level prior to re-introducing said bodies into said divisional flow of exit gas.

29. The method according to claim 27 further comprising the step of cooling said condensation bodies by exposing at least a portion thereof to atmospheric air after they have been removed from said divisional flow of exit gases.

30. The method according to claim 29 further comprising the step of utilizing said cleaned divisional flow of exit gas in the cement manufacturing process after the removal of the gaseous compounds therefrom.

31. The method according to claim 30 further comprising the steps of: reuniting at least a portion of said divisional flow of exit gas with said main flow of exit gas after removing said gaseous compounds at a point at which the temperature of the divisional flow is substantially identical to the temperature of said main flow so as to efficiently utilize the heat contained in said gases; and removing at least a portion of suspended dust from said gases prior to discharging them into the atmosphere.

32. The method according to claim 30 further comprising the step of utilizing the heat contained in said cleaned divisional gas flow by adding at least a portion of the cleaned divisional gas flow to the primary and/or secondary air supplied to support combustion in the kiln.

33. The method according to claim 30 further comprising the step of utilizing the heat contained in said cleaned divisional gas flow by directing at least a portion of the cleaned divisional flow to a grinding mill for preheating cement raw materials during grinding thereof and prior to feeding said materials to a suspension preheater as raw meal.

34. The method according to claim 30 further comprising the step of directing at least a portion of the cleaned divisional flow of exit gas through a dust precipitator for removal of dust therefrom prior to discharging it into the atmosphere.

* * * * *